United States Patent
Hofbauer

(10) Patent No.: US 8,490,380 B2
(45) Date of Patent: Jul. 23, 2013

(54) INTERNAL CONTINUOUS COMBUSTION ENGINE SYSTEM

(75) Inventor: Peter Hofbauer, West Bloomfield, MI (US)

(73) Assignee: Advanced Propulsion Technologies, Inc., Goleta, CA (US)

( * ) Notice: Subject to any disclaimer, the term of this patent is extended or adjusted under 35 U.S.C. 154(b) by 865 days.

(21) Appl. No.: 12/321,163

(22) Filed: Jan. 16, 2009

(65) Prior Publication Data
US 2009/0183491 A1 Jul. 23, 2009

Related U.S. Application Data

(60) Provisional application No. 61/011,580, filed on Jan. 17, 2008.

(51) Int. Cl.
*F02G 3/02* (2006.01)
*F02D 41/32* (2006.01)
*F15B 13/044* (2006.01)

(52) U.S. Cl.
USPC .......... 60/39.63; 60/39.6; 60/39.62; 123/478; 137/596.17

(58) Field of Classification Search
USPC .......... 60/39.6, 39.62, 39.63, 39.64; 123/690, 123/478, 480, 516–520, 316; 137/596.17, 137/625.69, 625.65
See application file for complete search history.

(56) References Cited

U.S. PATENT DOCUMENTS

| | | |
|---|---|---|
| 125,166 A | 4/1872 | Brayton |
| 151,468 A | 6/1874 | Brayton |
| 2,688,230 A | 9/1954 | Milliken |
| 3,171,253 A | 3/1965 | Milliken |
| 3,577,729 A | 5/1971 | Warren |
| 3,886,734 A | 6/1975 | Johnson |
| 3,973,393 A | 8/1976 | Vogelsang |
| 4,015,424 A | 4/1977 | Shinohara |
| 4,212,162 A * | 7/1980 | Kobayashi ................... 60/39.63 |
| 6,170,443 B1 * | 1/2001 | Hofbauer ..................... 123/51 B |
| 6,170,524 B1 * | 1/2001 | Gray, Jr. ................... 137/625.18 |
| 6,412,273 B1 * | 7/2002 | Rohs ............................. 60/39.63 |
| 6,854,437 B1 | 2/2005 | Vazquez |
| 6,951,211 B2 * | 10/2005 | Bryant ........................ 123/559.1 |
| 7,263,968 B2 * | 9/2007 | Cairns et al. ................... 123/295 |
| 7,421,982 B2 | 9/2008 | Kamimura et al. |
| 7,765,785 B2 * | 8/2010 | Kashmerick ................... 60/39.6 |

* cited by examiner

*Primary Examiner* — William H Rodriguez
*Assistant Examiner* — Carlos A Rivera
(74) *Attorney, Agent, or Firm* — Brooks Kushman P.C.

(57) ABSTRACT

A continuous combustion system for an internal combustion engine includes a reaction vessel external to the engine cylinders. The reaction vessel contains a combustion chamber for sustaining continuous combustion of an air fuel mixture during the operation of the associated engine. The reaction vessel contains an incoming air chamber and an exhaust gas chamber that are each in communication with the combustion chamber. Injected fuel vapor is mixed with scavenged exhaust gas for pre-heating and with compressed air from each cylinder provided during the compression stroke of each piston. The compressed air and fuel vapor mixture sustains the ignited combustion continuously, while exhaust gas is fed to the cylinders to provide working fluid to the engine during the power stroke of each piston. A valve mechanism is provided to control the flow of air from and working fluid to the cylinders at the appropriate times in order to sustain operation of the engine.

23 Claims, 4 Drawing Sheets

INTERNAL CONTINUOUS COMBUSTION ENGINE SYSTEM

RELATED APPLICATION

This application claims the benefit of U.S. provisional application Ser. No. 61/011,580 filed on Jan. 17, 2008.

BACKGROUND

1. Field of the Invention

The invention is directed to the field of internal combustion engines and more specifically to the area of utilizing continuous combustion for powering such engines.

2. Description of the Prior Art

It is well known that two and four stroke internal combustion engines are configured to have a variable combustion chamber as part of the cylinder in which the associated piston reciprocates. In the case of the "Internal Combustion Engine With a Single Crankshaft and Having Opposing Cylinders and Opposing Pistons in Each Cylinder" described in my U.S. Pat. No. 6,170,443 and incorporated herein by reference ("OPOC engine"), each working chamber is a combustion chamber associated with a pair of opposing pistons in a cylinder to provide direct power expansion forces to the faces of the pistons. In each case, combustion is ignited at critical points of the engine stroke cycle resulting in intermittent and individual combustions for each piston cycle. For instance, in a conventional Diesel- or Otto-engine operating at 5000 rpm the total combustion in each cycle has to be initiated, controlled and finalized in only one millisecond. While such high speed combustions are manageable from an engine control standpoint, there is room for improvement in terms of simplification, efficiencies and especially emissions.

SUMMARY OF THE INVENTION

The present invention achieves the goal of simplifying internal combustion engine construction, operation, and maintenance by providing a reaction vessel which contains a central chamber where combustion takes place on a continuous and controlled basis external of the cylinders of the engine.

The present invention provides continuous internal combustion but intermittent application of hot gases to the moving parts of the engine. Air within the cylinder is initially compressed by the pistons during their compression cycle. The compressed air is transferred to a separate combustion chamber where it is combined with a fuel to support a controlled continuous combustion. The combustion product is a hot pressurized working fluid which is transferred to the same cylinder after the pistons reach top-dead-center ("TDC") for conversion to work by expansion in the cylinder. The cylinder of the OPOC engine contains reciprocating pistons which define, with the cylinder, the working chamber. The pistons are movable with cyclic motions which cause alternate expansion and contraction of the working chamber. The combustion chamber is separate from the working chamber and contains means for burning a fuel utilizing the compressed air at substantially constant pressure to produce a hot pressurized working fluid.

During operation of the continuous combustion engine, the intake port is opened to admit air into the working chamber. In the case of a 2-cycle OPOC engine, the air is forced into the chamber under pressure, such as by the use of a turbocharger or air pump. This air is then compressed during subsequent contraction of the working chamber during the compression stroke of the pistons. During this compression, and before TDC, a valving mechanism is opened to allow transfer the compressed air to the combustion chamber. In the combustion chamber air is combined with fuel to sustain combustion at a substantially constant pressure to produce a hot pressurized working fluid. Working fluid is then transferred to the same cylinder through the valving mechanism after the pistons reach their TDC positions to undergo expansion in the working chamber and drive the pistons in their cyclic motion. After expansion, the spent working fluid is exhausted through the exhaust port.

Combustion gasses produced in the reaction vessel are conducted through passages to each cylinder and allowed to enter each cylinder by a control valving mechanism. Each valving mechanism is controlled to coordinate the entry of combustion gasses (working fluid) into the cylinder at or after the reciprocating piston reaches its top dead center position at the end of its compression stroke in order to provide the expansion forces necessary to drive the piston in the opposite direction during its power stroke. In the case of an OPOC engine, where the opposing pistons are asymmetric in their travel within the cylinder and reach TDC at slightly different times, the working fluid is introduced to the cylinder just after both opposing pistons have reached their TDC positions.

The combustion chamber within the reaction vessel is connected to receive air from each cylinder near the end of the compression stroke of each piston to provide the air necessary to sustain the combustion in the combustion chamber.

The reaction vessel is configured to scavenge and recirculate a portion of the exhaust gas within the reaction vessel to preheat and carry the injected fuel vapor into the combustion chamber where it adds to the combusted mixture.

The continuous combustion provided by the present invention allows for a reduction in components and improved operation and maintenance. For instance, a single fuel injector and a single ignition device are utilized as opposed to a plurality of unique devices for each cylinder in conventional intermittent combustion engines. Additionally, a less complicated control and injection driver system is required, since only a single fuel injector is utilized for a plurality of cylinders.

Other advantages are also realized. For instance, an engine utilizing the constant or continuous combustion will produce less noise than an engine utilizing a conventional intermittent combustion which produces a series of explosions. Another advantage is a reduction in polluting by-products, do to more complete combustion in a controlled and continuous environment.

DETAILED DESCRIPTION OF THE PREFERRED EMBODIMENT

Figure 1:
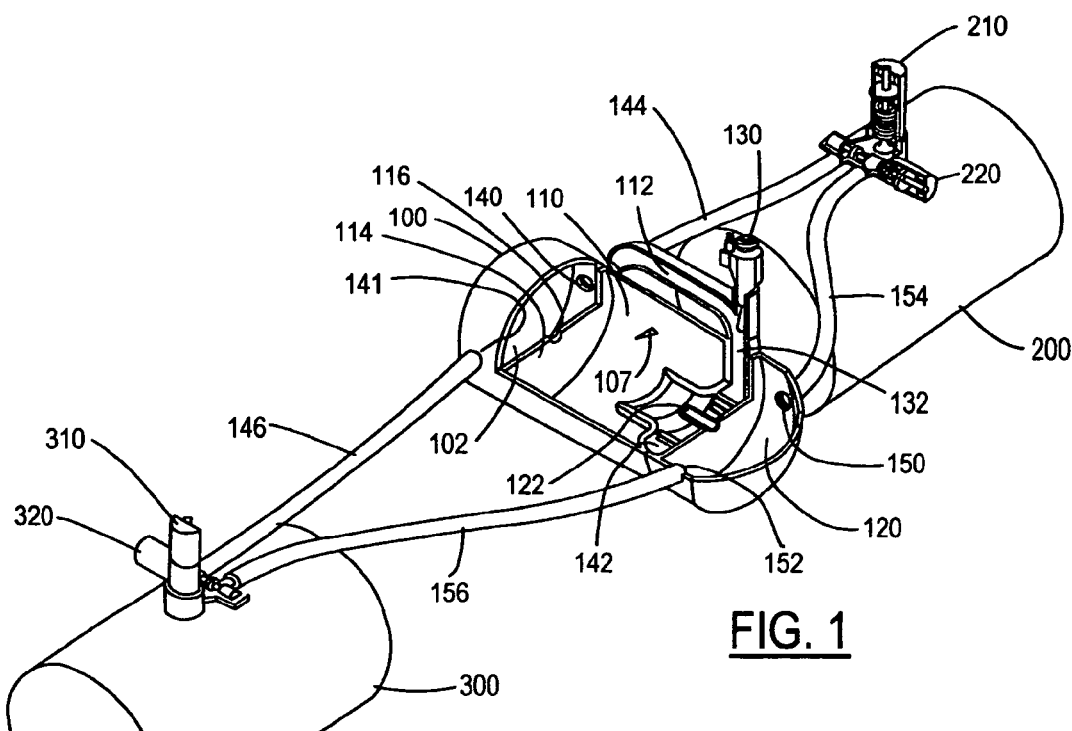
FIG. 1 is an overall depiction of the present invention installed on an OPOC engine.

An embodiment of the internal continuous combustion engine system of the present invention is depicted in FIG. 1. In this embodiment, the system is installed in an OPOC engine of the type referenced above. However, it is noted that this invention is also suited as an improvement for all internal combustion engines of both four and two stroke types, as well as those that employ either diesel or spark ignition systems.

In FIG. 1, an external, remote reactor vessel 100 is shown that provides the continuous combustion of working fluid that is supplied to the cylinders of the engine. Cylinders 200 and 300 are similar in configuration; and as is typical in an OPOC engine, each cylinder contains a pair of opposing pistons (shown in FIG. 7) that operate in opposite phases with respect to the pair of pistons in the opposing cylinder. That is, when the opposing pistons of cylinder 200 each reach their top-dead-center ("TDC") positions, the pistons of the opposing cylinder 300 are at their approximate bottom-dead-center ("BDC") positions.

Electro-mechanical valving mechanisms 210/220 and 310/320 are attached to respective cylinders 200 and 300 at the ports that would normally be designated for fuel injection near the TDC volume defined in each cylinder. The valving mechanisms are electrically controlled to provide delivery of combustion gases (working fluid) from reactor vessel 100 to the cylinders when the pistons have each reached their TDC positions and provide the expansion energy required to complete the power stroke of the piston(s) in each cylinder.

Figure 5:
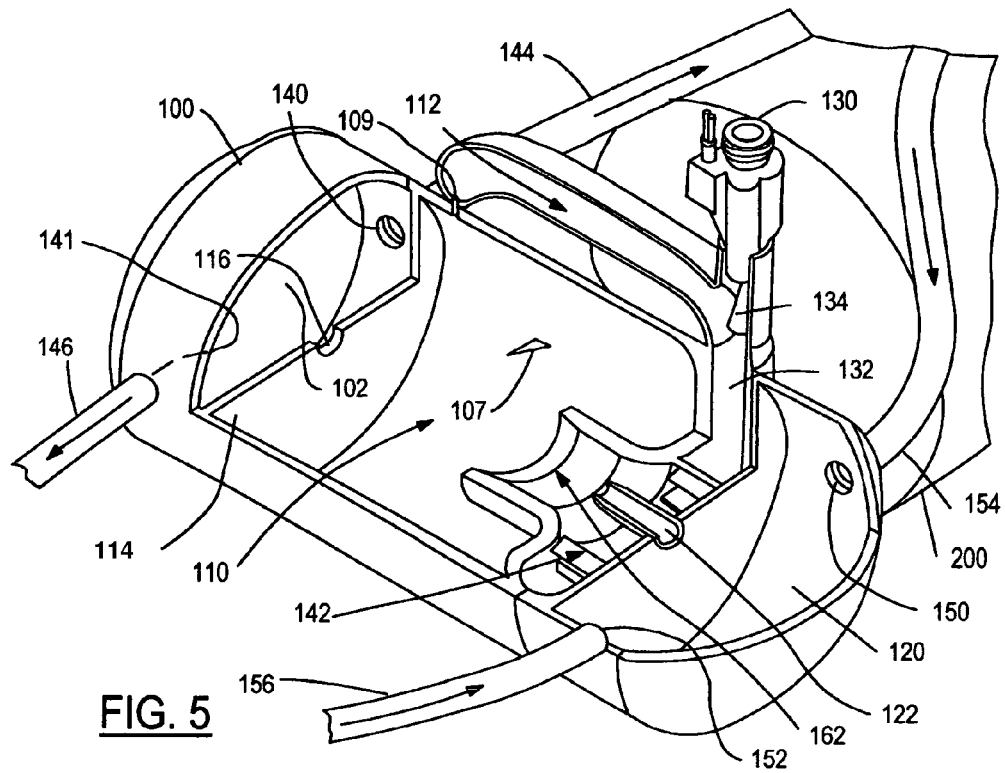
FIG. 5 is a more detailed and enlarged view of the reaction vessel shown in FIG. 1.
Figure 6:
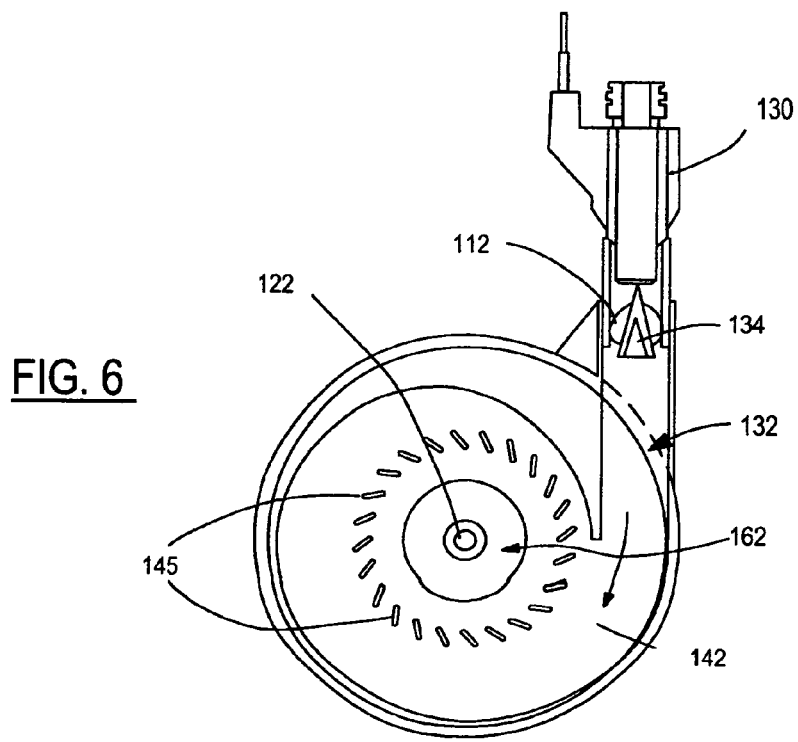
FIG. 6 is a cross-sectional view of the swirl chamber of the reaction vessel shown in FIGS. 1 and 5.

With reference to FIGS. 1, 5 and 6, the reactor vessel 100 is configured to have a combustion chamber 110, an air supply chamber 120 and an exhaust gas chamber 102. Air supply chamber 120 has a plurality of supply ports 150 and 152 that are connected via high pressure tubing or hoses 154 and 156 respectively, to receive compressed air from each cylinder. (It should be noted that the representation of the reaction chamber being outside the structure of the engine and high pressure tubing or hoses could conceivably be integrated as a structural part of the engine with high pressure passages formed therein.) Air supply chamber 120 also has an outlet port 122 that supplies compressed air freely into combustion chamber 110. A swirl chamber 142 is located between the air supply chamber 120 and the combustion chamber 110 and provides an air/fuel mixture to the combustion chamber via its injection nozzle 162. The exhaust gas chamber 102 is located at the opposite end of the combustion chamber 110 and is in communication with the combustion chamber via exit port 116. The exhaust gas chamber 102 has a plurality of exhaust ports 140 and 141 that are connected via high pressure tubing or hoses 144 and 146 respectively, to provide the high pressure and heated exhaust gas working fluid to each cylinder. In addition, a feedback passage 112 is provided to allow a small portion of exhaust gas to be scavenged via scavenging port 109 from the reaction vessel and provided to the fuel entry passage 132 adjacent the fuel injector 130. Combustion chamber 110 supports the continuous combustion of a vaporized fuel, exhaust gas and air mixture that exits the chamber as pressurized and heated exhaust gas through exit port 116 in end wall 114. A fuel injector 130 provides the atomized fuel vapor spray 134 and is supplied to the combustion chamber via a swirl chamber 142 and an injection nozzle 162. A venturi effect is produced by the compressed air entering combustion chamber 110 through port 122. Since the port 122 is surrounded by injection nozzle 162, this effect produces a vacuum in swirl chamber 142 which draws scavenged exhaust gas from feedback passage 112 mixed with the fuel vapor spray 134 provided by fuel injector 130. The scavenged exhaust gas provides preheating of the fuel vapor prior to becoming mixed with the compressed air in the combustion chamber 110.

Any conventional ignition device 107 can be employed. Ignition sources typically could include a spark plug, glow plug, or spark discharge device to establish the initial ignition. However, once combustion is commenced, there is no need to provide further ignition, since the system will feed the combustion chamber with a fuel air mixture that is continually sustained until the fuel supply is shut off or combustion air supply is terminated.

Once combustion is commenced, the combustion gasses are under high pressure and exit through exhaust port 116, into exhaust chamber 102. From there, the exhaust gasses are routed into each cylinder when the corresponding pistons have reached their TDC positions by the electromechanical valving mechanisms 210/220 and 310/320. In order to avoid redundant descriptions, the following discussion will focus on valving mechanism 210/220. The electro-mechanical valving mechanisms 210/220 and 310/320 are identical in construction, function and operation, and only differ by being operated in different phases.

Figure 2:
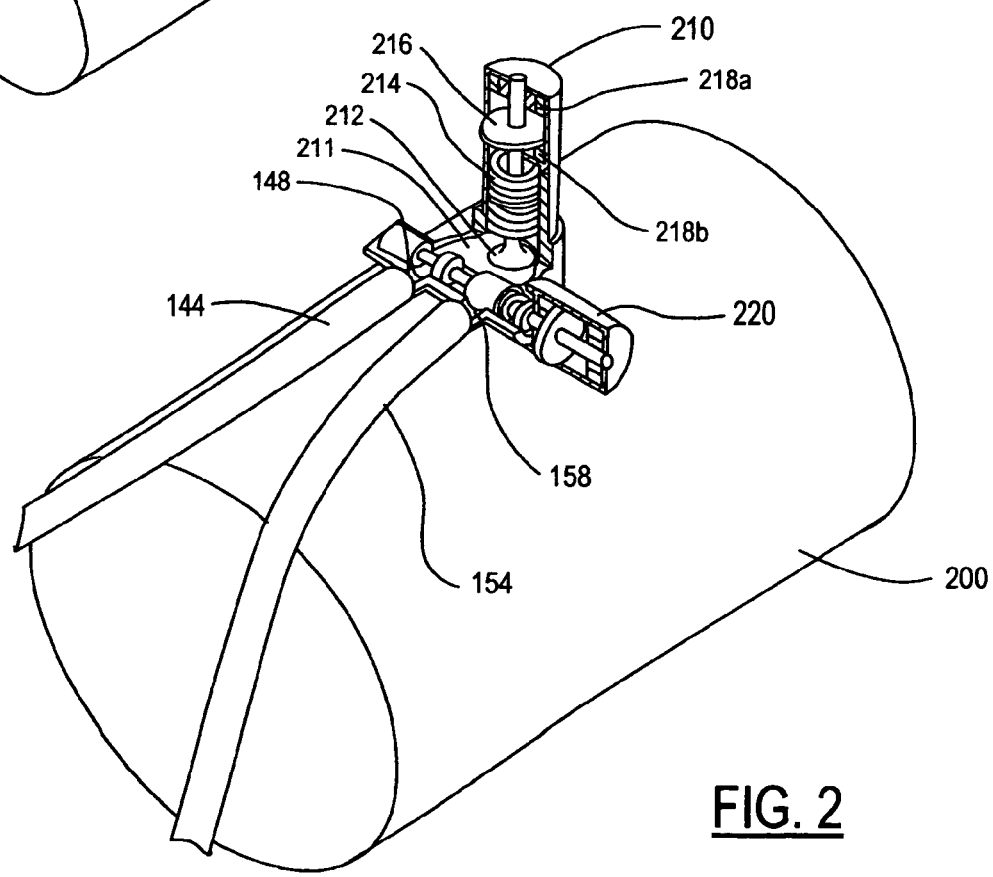
FIG. 2 is cut-away perspective view of the electromechanical valving mechanism applied to a cylinder of an internal combustion engine.
Figure 3:
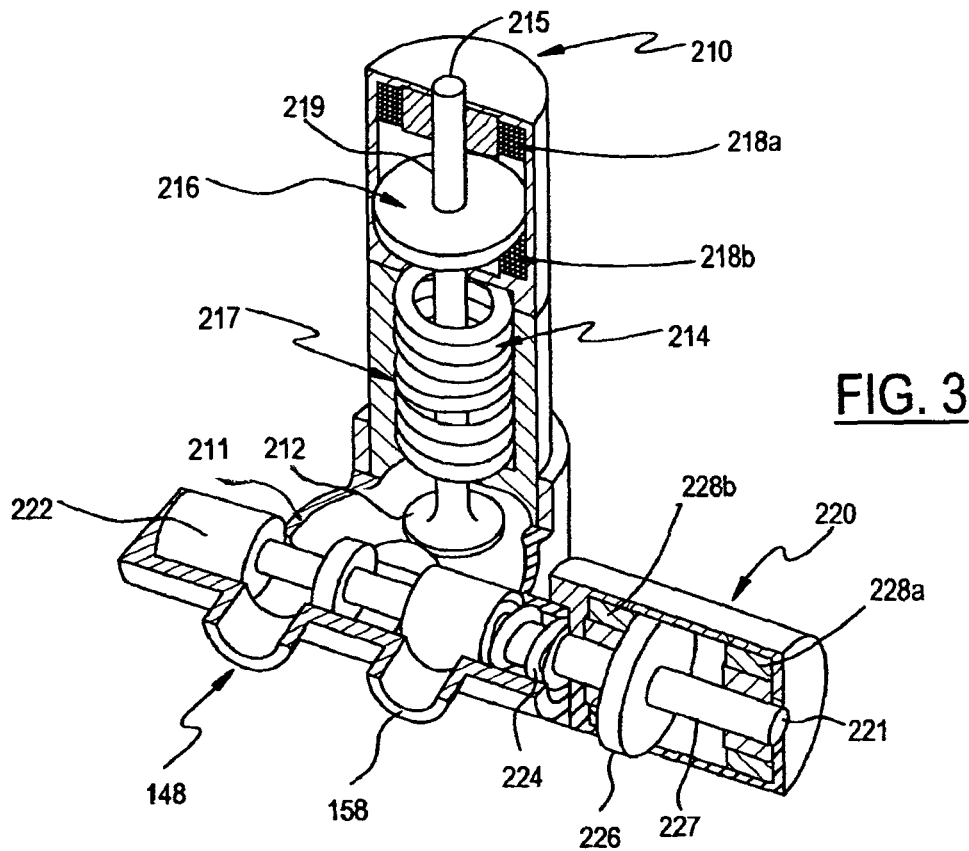
FIG. 3 is a cut-away perspective enlargement of the valving mechanism shown in FIG. 2.
Figure 4:
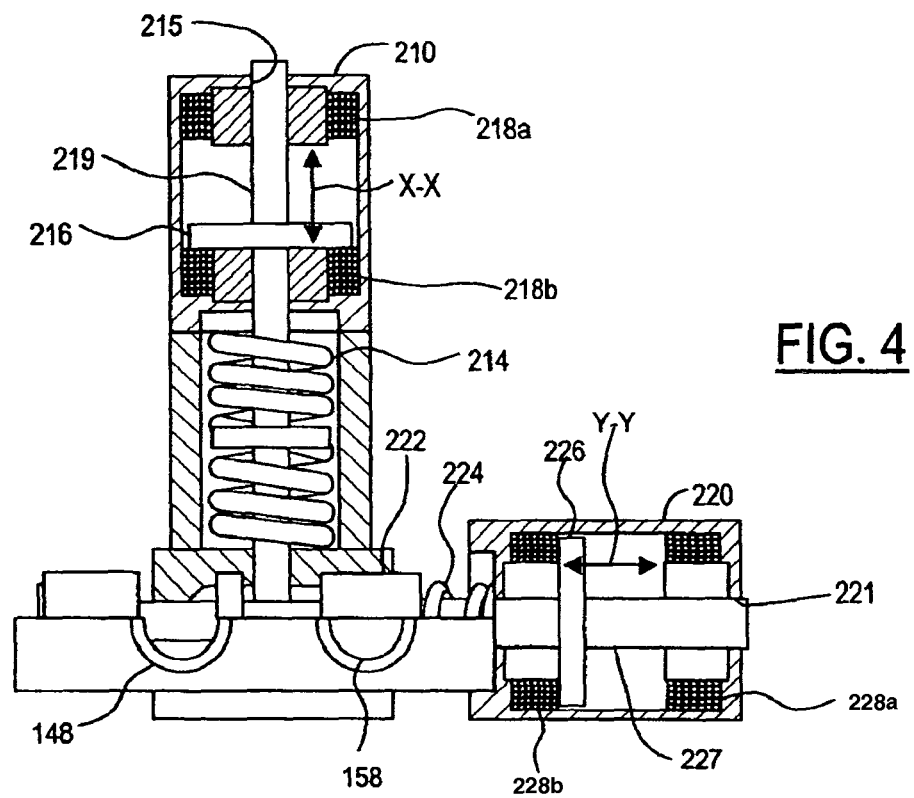
FIG. 4 is a cross-sectional plan view of the mechanism shown in FIGS. 2 and 3.

In FIGS. 2, 3 and 4, the electromechanical valving mechanisms 210/220 are depicted as mounted in a common housing 211. The valving mechanism 220 contains a spool valve 222 which is linearly movable to open exhaust gas port 148 to supply combusted exhaust gas working fluid under pressure to the cylinder 200 during the power stroke phase following the pistons reaching TDC. The spool valve 222 also is linearly movable to close off that supply and open up the compressed air port 158. The valving mechanism 210 drives a seated valve 212 that is in direct communication with the cylinder 200. At predetermined times, valve 212 is opened to allow the compressing air from the cylinder to feed reactor vessel 100 and then to allow the high pressure exhaust gas working fluid to enter the cylinder.

In this embodiment, valving mechanism 220 includes a solenoid which includes a pair of electromagnetic coils 228 which are used to drive a ferrous plate 226 mounted on a rod 227 that is connected to spool valve 222. In this embodiment, rod 227 extends through an aperture 221 in the housing of valve mechanism 220. A biasing spring 224 is provided to position the spool valve 222 in the position shown in FIGS. 2, 3 and 4.

Valving mechanism 210 includes a solenoid having a pair of electromagnetic coils 218a and 218b which are used to drive a ferrous plate 216 mounted on a rod 219 that is connected to seated valve 212. A biasing spring 214 is provided to position the seated valve 212 in a half open condition by interacting with a plate 217 mounted on rod 219 when the coils 218a and 218b are not energized. In this embodiment, rod 219 is shown as extending through an aperture 215 in the housing of valve mechanism 210. When coils 218a and 218b are energized, valve 212 is held in the closed position, as shown in FIGS. 2, 3 and 4.

Swirl chamber 142 is depicted in FIG. 6. Swirl chamber 142 has an internal spiral cavity formed with a fuel injection entry passage 132 on the outer portion of the spiral cavity. A plurality of mixing vanes 145 are positioned in a circular pattern to cause disturbance and mixing of the fuel vapor with the scavenged exhaust gas prior to being forced through port 122 and into combustion chamber 110. Fuel injector 130 is mounted on entry passage 132 so that atomized fuel vapor spray 134 is evaporated into the hot and pressurized exhaust gas scavenged via scavenging port 109 and delivered through feedback passage 112. The vaporized fuel and exhaust mixture is then drawn into the internal swirl chamber 142 by the venturi effect of compressed air being jetted out through port 122. The vaporized fuel and exhaust mixture is mixed with the compressed air from the cylinder(s) and combusted in combustion chamber 110.

In operation, as the piston (or pistons in the case of an OPOC engine) in cylinder 200 starts its compression stroke, coils 218a and 218b of the valve mechanism 210 are energized to move plate 216 and rod 219 upwards a distance X-X (FIG. 4) to close the valve 212. Prior to the piston reaching its TDC position, coils 218a and 218b are de-energized and the force of biasing spring 214 causes seated valve 212 to open. Coils 228a and 228b of valve mechanism 220 are energized to open compressed air port 158 as the piston approaches TDC. The force applied to plate 226 by the energized coils 228a and 228b is sufficient to overcome the force of biasing spring 224 and draw the spool valve 212 to the right and close exhaust gas port 148 while opening compressed air port 158. At TDC, the coils 228 of valve mechanism 220 are de-energized and the spring 224 forces plate 226 and rod 227 to the left a distance Y-Y (FIG. 4) to close the compressed air port 158 and open the exhaust gas (working fluid) port 148.

During and near the end of the compression stroke of the piston, compressed air is supplied through conduit 154 to compressed air chamber 120 where it is allowed free passage into combustion chamber 110 via nozzle 122.

By cycling the valve mechanisms in synchronism with the stroke cycle of the pistons, compressed air is supplied to and working fluid, in the form of exhaust gases, are released from the combustion chamber to support continuous combustion therein.

When one considers that another cylinder 300 is working in opposite phase with cylinder 200, it can be seen that there may be a pulsated backpressure, but essentially continuous delivery of compressed air to the combustion chamber; and a pulsated but essentially corresponding continuous release of working fluid from the combustion chambers. With an increased number of cylinders connected to the combustion chamber backpressure effects will be reduced.

Before TDC in cylinder 200 and when compressed air is entering air supply chamber 120 from conduit 154, combustion is continuously supported in combustion chamber 110 and after TDC the combustion gasses are being supplied to cylinder 300 through valving mechanisms 310/320 after the piston(s) in that cylinder reached TDC.

Shortly after the piston(s) in cylinder 200 reach TDC, valving mechanism 220 is de-energized to allow spring 224 to move spool valve 222 to the left in order to both close compressed air port 158 and open exhaust gas port 148. Valving mechanism 210 opens seated valve 212 to allow exhaust gases to enter cylinder 200 and provide the necessary energy to drive the piston(s) during its power stroke. Valve 212 is then closed before the piston reaches its BDC position and remains closed until the piston enters its compression stroke.

Combustion is substantially continuous, even though fuel injection may be controlled with pulse width modulation ("PWM") to regulate the intensity and power generated by the combustion, the result is less components and improved operation and maintenance.

The fact that there are no more pulsating explosions occurring in each cylinder, the noise generated due to such explosions is eliminated. In addition, NOX emissions are substantially reduced with an extremely high exhaust recirculation rate, while fuel economy is also enhanced.

Figure 7:
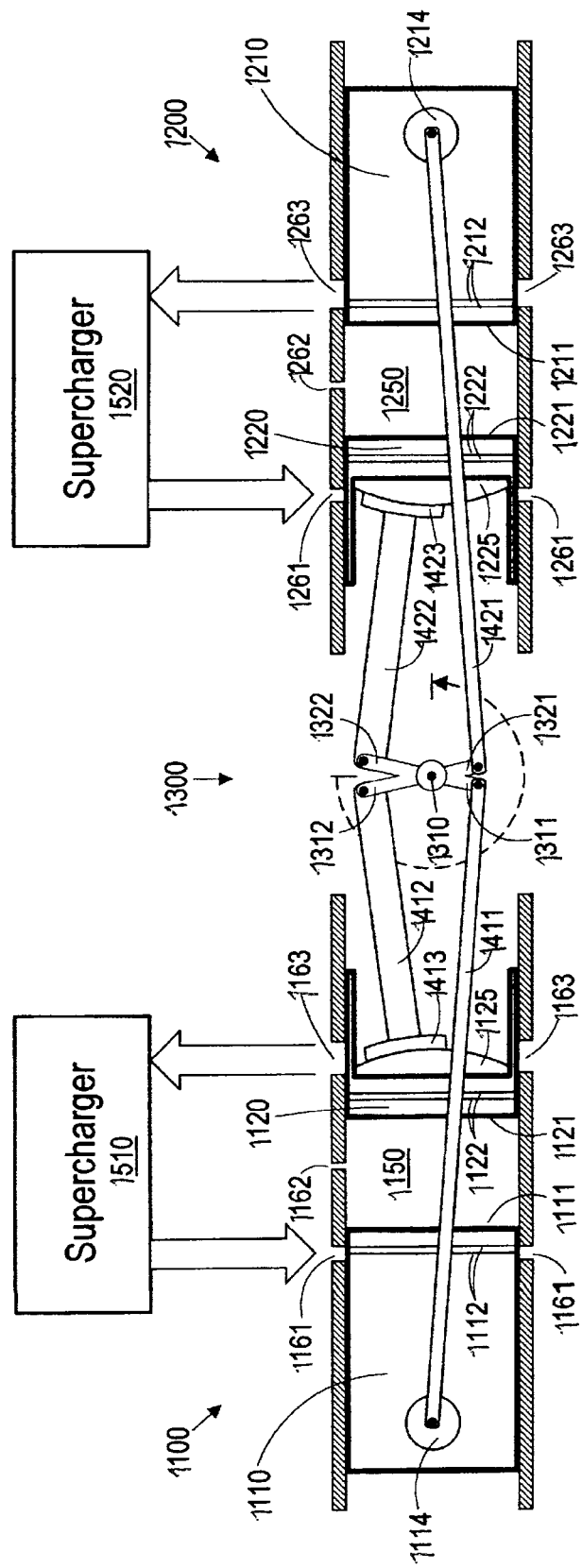
FIG. 7 is a schematic representation of the engine configuration according to one embodiment of the disclosure.

FIG. 7 illustrates an internal combustion engine having opposed cylinders with opposed pistons. As illustrated in FIG. 7, the engine configuration comprises a left cylinder 1100, a right cylinder 1200, and a single central crankshaft 1300 located between the cylinders (for clarity, the supporting structure of the engine is omitted from FIG. 7).

The left cylinder 1100 has an outer piston 1110 and an inner piston 1120, with combustion faces 1111 and 1121 respectively, the two pistons forming a combustion chamber 1150 between them. The right cylinder 1200 similarly has an outer piston 1210, an inner piston 1220, with combustion faces 1211 and 1221 and combustion chamber 1250. Each of the four pistons 1110, 1120, 1210, and 1220 are connected to a separate eccentric on the crankshaft 1300.

The outer piston 1110 of the left cylinder is connected to crankshaft eccentric 1311 by means of pullrod 1411; the outer piston 1210 of the right cylinder is similarly connected to crankshaft eccentric 1321 by pullrod 1421. While single pullrods are shown in FIG. 7, a pair of pullrods can be used, with one pullrod on the near side of each cylinder and one on the far side, with the near and far side pullrods connected to separate crankshaft journals having the same angular and offset geometries. Since the pullrods 1411 and 1421 are typically always in tension during normal engine operation and need only support a minor compressive force during engine startup, as will be further explained below, they may be relatively thin and therefore lightweight. The pullrods 1411 and 1421 communicate with the outer pistons by means of pins 1114 and 1214 which pass through slots (not shown) in the cylinder walls; outer pistons 1110 and 1210 are elongated and the pins are located towards the rear of the pistons to prevent gas losses from the cylinders through the slots. The long length of the pullrods relative to the crankshaft throws serves to reduce friction losses in the engine.

The inner piston 1120 of the left cylinder is connected to crankshaft eccentric 1312 by means of pushrod 1412; the inner piston 1220 of the right cylinder is similarly connected to crankshaft eccentric 1322 by pushrod 1422. During normal engine operation, pushrods 1412 and 1422 are always under compression; rather than being connected to the inner pistons by pins, the pushrods have concave ends 1413 and 1423 which ride on convex cylindrical surfaces 1125 and 1225 on the rear of the inner pistons. This arrangement serves to effectively lengthen the pushrod length, which reduces friction losses and helps dynamically balance the engine, as discussed below.

The four pistons 1110, 1120, 1210, and 1220 are shown with a plurality of piston rings 1112, 1122, 1212, and 1222, respectively, located behind the combustion faces. In a practical embodiment of the engine, additional piston rings may be employed further along the piston bodies to prevent the escape of gases from the ports to the crankcase or through the slots (not shown) in the cylinder walls through which the outer pistons communicate with the pullrods.

The cylinders 1100 and 1200 each have intake, exhaust, and fuel injection ports. On the left cylinder 1100, the outer piston 1110 opens and closes intake ports 1161 and the inner piston 1120 opens and closes exhaust ports 1163. Fuel injection port 1162 is located near the center of the cylinder. On the right cylinder 1200, the inner piston 1220 opens and closes intake ports 1261 and the outer piston opens and closes exhaust ports 1263. Again, fuel injection port 1262 is located near the center of the cylinder. The asymmetric arrangement of the exhaust and intake ports on the two cylinders serves to help dynamically balance the engine, as described below.

Each of the four crankshaft eccentrics 1311, 1312, 1321, and 1322 are uniquely positioned with respect to the crankshaft rotational axis 1310. The eccentrics for the inner pistons 1312, 1322 are further from the crankshaft rotational axis than the eccentrics for the outer pistons 1311, 1321, resulting in greater travel for the inner pistons than for the outer pistons. The eccentrics for the inner left piston 1312 and the outer right piston 1321, the pistons which open and close the exhaust ports in the two cylinders, are angularly advanced, while the eccentrics for the outer left piston 1311 and inner right piston 1322 are angularly retarded (note that the direction of crankshaft rotation is counterclockwise, as indicated by the arrow).

As can be seen by the drawings and accompanying explanation, the present invention is a unique improvement over conventional engines. While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention claimed is:

1. A continuous combustion system for a reciprocating piston engine containing a plurality of cylinders and pistons within said cylinders, comprising:
   a reaction vessel external of the plurality of cylinders for sustaining a continuous combustion of fuel and air mixture during the operation of the associated engine;
   wherein the reaction vessel is connected to each of the plurality of cylinders to receive compressed air from each of the cylinders during a first predetermined period of the piston cycle in each cylinder and to supply working fluid in the form of combusted gas to the cylinders during a second predetermined period of the piston cycle in each cylinder, wherein the reaction vessel includes a combustion chamber, an incoming air chamber, an exhaust chamber, a fuel injection chamber and a fuel feedback passage, wherein the fuel injection chamber is located between the incoming air chamber and the combustion chamber;
   a valving mechanism in communication with each of the plurality of cylinders to allow the compressed air from each cylinder to enter the reaction vessel over the first predetermined period of the piston cycle and to allow the combusted gases from the reaction vessel to enter each cylinder over the second predetermined period of the piston cycle; and
   a fuel injector mounted on the reaction vessel to provide a controlled amount of fuel to the fuel injection chamber, wherein the fuel feedback passage comprises an outlet passage portion extending from one of the exhaust chamber and the combustion chamber into an entry passage portion of the fuel injection chamber such that the controlled amount of fuel is atomized and mixed with an exhaust gas stream in the fuel injection chamber to form a fuel vapor mixture prior to being mixed with air from the incoming air chamber in the combustion chamber.

2. The continuous combustion system as in claim 1, wherein the incoming air chamber is connected to the valve mechanism to receive compressed air from at least one of the plurality of cylinders over the first predetermined period of the piston cycle and includes an outlet port that extends from the fuel injection chamber, wherein air entering into the combustion chamber from the incoming air chamber produces a venturi effect that pulls the fuel vapor mixture from the fuel injection chamber into the combustion chamber.

3. The continuous combustion system as in claim 1, wherein the valving mechanism contains at least one electrically actuated seated valve connected to each cylinder, wherein each seated valve is controlled to open when pressure in the cylinder is generally equal to pressure in the incoming air chamber.

4. The continuous combustion system as in claim 3, wherein the valving mechanism comprises at least one electrically actuated spool valve connected to each of the cylinder, wherein each spool valve is controlled to open communication between the cylinder and the incoming air chamber during a compression stroke before the seated valve opens, the spool valve moving to close communication between the cylinder and the incoming air chamber and open communication between the cylinder and the exhaust gas chamber.

5. The continuous combustion system as in claim 3 wherein the each seated valve is controlled to close when the piston is past a top dead center position and a predetermined mass of the combusted gas has entered the cylinder.

6. The continuous combustion system as in claim 1, wherein the fuel injection chamber is formed as a spiral cavity with a fuel injection entry passage along an outer portion and a plurality of mixing vanes positioned in a circular pattern to create turbulence and mixing of the controlled amount of fuel with the exhaust gas stream prior to entering the combustion chamber to support vortex breakdown combustion in the combustion chamber.

7. The continuous combustion system as in claim 1 further comprising two opposed cylinders, each cylinder having two pistons recipocably mounted therein.

8. A continuous combustion system for an engine, the system comprising:
   two opposed cylinders, each cylinder having two pistons reciprocably mounted therein;
   a reaction vessel external from the cylinders for sustaining continuous combustion of an air-fuel mixture, the reaction vessel receiving compressed air from the cylinders during a first predetermined period of the piston cycle of each of the cylinders and the reaction vessel supplying exhaust gas to the cylinders during a second predetermined period of the piston cycle of each of the cylinders;
   a valving mechanism in communication with each of the cylinders to control flow of compressed air from the cylinders to the reaction vessel during the first predetermined period of the piston cycle and to control flow of the exhaust gas from the reaction vessel to the cylinders during the second predetermined period of the piston cycle; and
   a fuel injector mounted to provide fuel thereby supporting continuous combustion of an air-fuel mixture in the reaction vessel.

9. The continuous combustion system as in claim 8, wherein the reaction vessel further comprises a swirl chamber that is formed as a spiral cavity and comprising a plurality of mixing vanes positioned in a circular pattern.

10. The continuous combustion system as in claim 8, wherein the valving mechanism comprises an electrically actuated spool valve in order to maintain high-speed control of the flows between each of the cylinders and the reaction vessel.

11. The continuous combustion system as in claim 10 wherein the valving mechanism further comprises an electrically actuated seated valve connected to each of the cylinders.

12. The continuous combustion system as in claim 10 wherein the reaction vessel includes an exhaust gas feedback passage to provide an exhaust gas stream to the reaction vessel.

13. The continuous combustion system as in claim 12, wherein the reaction vessel further comprises a swirl chamber configured to promote turbulence and to cause the fuel and exhaust gas stream to swirl to prior to being mixed with the compressed air to support vortex breakdown combustion.

14. The continuous combustion system as in claim 13, wherein the swirl chamber is disposed between a combustion chamber and an incoming air chamber for receiving the compressed air from the cylinders, the reaction vessel further comprising an incoming air chamber outlet port that extends from the incoming air chamber to the swirl chamber, wherein the compressed air entering into the combustion chamber from the incoming air chamber outlet port produces a venturi effect that pulls fuel vapor into the combustion chamber.

15. A continuous combustion system for an engine having a plurality of cylinders and pistons within said cylinders, the continuous combustion system comprising:
   a reaction vessel external from the cylinders for sustaining continuous combustion of an air-fuel mixture, the reaction vessel having an incoming chamber and an exhaust chamber; and
   a valving assembly including a spool valve disposed between one of the cylinders and the reaction vessel with the spool valve in fluidic communication with the incoming chamber and the exhaust chamber, the spool valve including a first pair of electromagnetic coils and a first plate mounted to move therebetween,
   wherein in response to actuation of at least one of the first pair of electromagnetic coils, the first plate is movable between a first position during a first predetermined time relative to piston movement in the one cylinder and movable to a second position during a second predetermined time relative to piston movement in the one cylinder,
   wherein in the first position, the spool valve allows flow between the one cylinder and the incoming chamber; and in the second position the spool valve allows flow between the one cylinder and the exhaust chamber,
   wherein the spool valve, includes a spring, wherein actuation of the first pair of electromagnetic coils includes de-energizing of the coil such that the spring moves the first plate to one of the first position or the second position when the first pair of electromagnetic coils are de-energized.

16. The continuous combustion system as in claim 15 wherein the valve assembly further comprises a seated valve connected to each of the cylinders, wherein the seated valve and spool valve are mounted in a common housing.

17. The continuous combustion system as in claim 16 wherein the seated valve includes a pair of electromagnetic coils and a plate mounted therebetween, wherein in response to actuation at least one of the pair of electromagnetic coils the plate is movable between an open position and a closed position to maintain high-speed control of flow between each of the cylinders and the reaction vessel.

18. The continuous combustion system as in claim 16 wherein the each of the seated valves is controlled to open when pressure in the cylinder is generally equal to pressure in the reaction vessel.

19. The continuous combustion system as in claim 18, wherein each of the spool valves is commanded to the first position before the seated valve opens, the spool valve moving to close flow of compressed air and open flow of the exhaust gas from the reaction vessel to the cylinder.

20. The continuous combustion system as in claim 16 wherein each of the seated valves is controlled to close communication between one of the cylinders and the reaction vessel when the piston is past a top dead center position and a predetermined mass of the exhaust gas has entered the cylinders.

21. The continuous combustion system as in claim 15 further comprising a fuel injector in fluid communication with the reaction vessel to inject a fuel spray into an exhaust gas stream to promote evaporation of the fuel spray to a fuel vapor in the hot exhaust gas stream thereby supporting continuous combustion of the air-fuel mixture in the reaction vessel.

22. The continuous combustion system as in claim 15, wherein the reaction vessel further comprises a swirl chamber configured to promote turbulence.

23. The continuous combustion system as in claim 15 further comprising at least two opposed cylinders, each cylinder having two pistons reciprocably mounted therein.

* * * * *